United States Patent
Whittaker

(10) Patent No.: US 11,306,444 B2
(45) Date of Patent: Apr. 19, 2022

(54) PAVEMENT REINSTATEMENT

(71) Applicant: UNITED UTILITIES PLC, Warrington (GB)

(72) Inventor: Mark Whittaker, Warrington (GB)

(73) Assignee: United Utilities PLC, Warrington (GB)

(*) Notice: Subject to any disclaimer, the term of this patent is extended or adjusted under 35 U.S.C. 154(b) by 0 days.

(21) Appl. No.: 16/625,445

(22) PCT Filed: Jun. 21, 2018

(86) PCT No.: PCT/GB2018/051742
§ 371 (c)(1),
(2) Date: Dec. 20, 2019

(87) PCT Pub. No.: WO2018/234820
PCT Pub. Date: Dec. 27, 2018

(65) Prior Publication Data
US 2021/0148061 A1    May 20, 2021

(30) Foreign Application Priority Data

Jun. 21, 2017 (GB) .................................... 1709946

(51) Int. Cl.
*E01C 23/06* (2006.01)
*E01C 11/00* (2006.01)
(Continued)

(52) U.S. Cl.
CPC ............ *E01C 11/005* (2013.01); *E01C 23/06* (2013.01); *E01C 23/07* (2013.01); *G01G 17/06* (2013.01);
(Continued)

(58) Field of Classification Search
CPC ........ E01C 11/005; E01C 23/06; E01C 23/07; G06F 16/90335; G01G 17/06;
(Continued)

(56) References Cited

U.S. PATENT DOCUMENTS

| 5,947,636 A | 9/1999 | Mara |
| 6,244,782 B1 | 6/2001 | Bitelli |

(Continued)

FOREIGN PATENT DOCUMENTS

| CN | 1776102 A | 5/2006 |
| CN | 102154975 A | 8/2011 |
| CN | 201990923 U | 9/2011 |

OTHER PUBLICATIONS

International Search Report and Written Opinion for PCT/GB2018/051742, dated Sep. 13, 2018.
(Continued)

*Primary Examiner* — Raymond W Addie
(74) *Attorney, Agent, or Firm* — Merchant & Gould P.C.

(57) ABSTRACT

A system for processing a pavement reinstatement includes a weighing apparatus (502) for measuring a mass of reinstatement material. A reinstatement apparatus (10) is adapted to receive reinstatement dimension information and reinstatement material information and adapted to determine a required reinstatement material mass, and to provide a target air voids content of the reinstatement. The reinstatement apparatus is optionally adapted to receive an indication of the mass measured by the weighing apparatus and the indication is a verification of the weighing apparatus having measured the required mass.

17 Claims, 5 Drawing Sheets

(51) Int. Cl.
*G06F 16/903* (2019.01)
*E01C 23/07* (2006.01)
*G01G 17/06* (2006.01)
*G06K 19/07* (2006.01)
*G06Q 10/06* (2012.01)
*G06Q 10/00* (2012.01)
*G06Q 50/08* (2012.01)
*G06Q 50/26* (2012.01)

(52) U.S. Cl.
CPC ... *G06F 16/90335* (2019.01); *G06K 19/0723* (2013.01); *G06Q 10/06313* (2013.01); *G06Q 10/20* (2013.01); *G06Q 50/08* (2013.01); *G06Q 50/26* (2013.01)

(58) Field of Classification Search
CPC ......... G06K 19/0723; G06Q 10/06313; G06Q 10/20; G06Q 50/08; G06Q 50/26
USPC ..................... 404/84.05–84.8, 118
See application file for complete search history.

(56) References Cited

U.S. PATENT DOCUMENTS

| | | | |
|---|---|---|---|
| 6,749,364 B1* | 6/2004 | Baker | E01C 19/288 404/118 |
| 8,930,092 B2* | 1/2015 | Minich | E01C 19/48 701/50 |
| 2008/0249729 A1 | 10/2008 | Martinez et al. | |
| 2013/0136539 A1* | 5/2013 | Aardema | G01K 1/14 404/75 |

OTHER PUBLICATIONS

Search Report for British Patent Application No. GB1709946.6, dated Dec. 22, 2017.

Communication from European Patent Office related to corresponding European application, EP18737381.6, dated Sep. 20, 2021, six pages.

* cited by examiner

PAVEMENT REINSTATEMENT

This application is a National Stage of PCT/GB2018/051742, filed Jun. 21, 2018, which claims benefit of British Patent Application No. 1709946.6, filed Jun. 21, 2017, and which applications are incorporated herein by reference. To the extent appropriate, a claim of priority is made to each of the above disclosed applications.

The present invention relates to system for processing a pavement reinstatement. This invention also relates to reinstatement apparatus for processing a pavement reinstatement and a method of processing a pavement reinstatement.

Opening the pavement of pathways such as roads, footways, footpaths and cycle tracks is frequently necessary to provide access for installation, maintenance or repair of installations beneath the pavement (e.g. for gas, water, telecommunication, electrical power supply). Reinstatement of pavement openings is desired for continued use of the pavement. The reinstatement of pavement openings is often a matter of local regulation to ensure that the reinstatement conforms to performance standards to avoid subsidence and surface unevenness and susceptibility to damage.

In the UK the Highway Authorities & Utilities Committee of the Department for Transport provides specifications for the reinstatement of openings. According to the Code of Practice, Third Edition (England), April 2010 an opening can be reinstated by a procedure of laying and compaction of a suitable material such as a bituminous surface material. The reinstatement is required to comply with specific in-situ air voids content requirements, in dependence on the particular material and the intended use. If the air voids content is too high, then liquid can seep into the voids and freeze-thaw cycles result in damage to the surface. Oxidation can occur due to air flow in the voids, causing deterioration of the reinstatement. If the air voids content is too low, then the material can deform and result in irregularity of the surface. The following table from the Code of Practice quantifies ranges of permitted air voids content (in % by volume) for various materials for use in carriageways or footways:

TABLE 1

Permitted air voids contents, from Code of Practice Table S10.1

| | Permitted Air Voids Content | | | |
|---|---|---|---|---|
| | Carriageways | | Footways | |
| Bituminous Materials | Max % | Min % | Max % | Min % |
| Asphalt concrete (AC) 6 dense Surface Course | NP | NP | 13 | 2 |
| AC 10 close Surface Course | 11 | 2 | NP | NP |
| Hot rolled asphalt (HRA) Surface Course | 7 | 2 | 10 | 2 |
| Stone mastic asphalt (SMA) Surface Course | 8 | 2 | 10 | 2 |
| AC Binder Course | 10 | 2 | 12 | 2 |
| HRA Binder Course | 9 | 2 | 12 | 2 |
| SMA Binder Course | 6 | 2 | NP | NP |
| Permanent Cold-Lay Surfacing Materials (PCSM) | 10 | 2 | 13 | 2 |

NP = not permitted

In order to achieve the necessary air voids content in the reinstatement, the reinstatement is subjected to a specific compaction procedure, in particular specifying the number of compaction passes with a particular compaction device according to published guidelines. The following table from the Code of Practice specifies compaction procedures for bituminous mixtures for various compaction equipment and depending on the thickness of the layer (or lift) after compaction:

TABLE 2

Guidance for compaction procedures, from Code of Practice Table NG A8.3

| | Minimum number of passes per lift | | | |
|---|---|---|---|---|
| | Up to 40 mm compacted lift thickness | Up to 60 mm compacted lift thickness | Up to 80 mm compacted lift thickness | Up to 100 mm compacted lift thickness |
| Vibrotamper 50 kg minimum | 5 (#) | 7 (#) | NR | NR |
| Vibrating Roller, Single Drum | | | | |
| 600-1000 kg/m | 10 | 12 | NR | NR |
| 1000-2000 kg/m | 6 | 10 | NR | NR |
| 2000-3500 kg/m | 5 | 7 | 8 | NR |
| Over 3500 kg/m | 4 | 6 | 7 | NR |
| Vibrating Roller, Twin Drum | | | | |
| 600-1000 kg/m | 5 | 7 | NR | NR |
| 1000-2000 kg/m | 4 | 5 | 6 | 8 |
| Over 2000 kg/m | 3 | 4 | 4 | 6 |
| Vibrating Plate | | | | |
| 1400-1800 kg/m2 | 6 | NR | NR | NR |
| Over 1800 kg/m2 | 3 | 5 | 6 | 8 |
| For Areas of Restricted Access: | | | | |
| Vibrotamper 25 kg minimum | Minimum of 6 compaction passes | | | |
| Percussive Rammer 10 kg minimum | Maximum of 75 mm compacted lift thickness | | | |

NR = Not Recommended
# = Vibrotamper not recommended on permanent surface course of trenches >500 mm width The minimum depth of a reinstatement may depend on the type of carriageway or footway, and on whether the reinstatement is over concrete or not. The following table specifies some typical minimum reinstatement depths for various types of carriageway and footway and depending on whether the reinstatement is over concrete or not:

TABLE 3

Guidance for reinstatement

| | Footway type Minimum depth (mm) | |
|---|---|---|
| Road | If not on concrete | If on concrete |
| Road type 0 | 345 | 100 |
| Road type 1 | 320 | 100 |
| Road type 2 | 285 | 100 |
| Road type 3 | 100 | 100 |
| Road type 4 | 100 | 100 |
| Footway type 1 | 60 | 60 |
| Footway type 2 | 80 | 30 |
| Footpath type 1 | 60 | 60 |
| Footpath type 2 | 80 | 30 |

For reinstatements of large depth (e.g. over 40 mm deep) one or more additional layers, also referred to as lifts, can be laid and compacted in sequence. The thickness that a lift (after compaction) may have is dependent on the particular material used; e.g. for 6 mm DSC (an AC 6 dense surface course) a minimum compacted lift thickness of 15 mm is required, the nominal lift thickness is 20-30 mm, and the maximum compacted lift thickness at any point is 40 mm. The following table from the Code of Practice specifies compacted lift thicknesses for various bituminous materials:

TABLE 4

Compacted lift thickness for bituminous mixtures, from Code of Practice Table A2.1

| Material Type | PD 6691 Reference | Minimum at any point (mm) | Nominal Lift Thickness (mm) | Maximum at any point (mm) |
|---|---|---|---|---|
| 6mm DSC | AC 6 dense surf | 15 | 20-30 | 40 |
| 10 mm CGSC | AC 10 close surf | 25 | 30-40 | 50 |
| 15/10 HRA | HRA 15/10 F surf | 25 | 30 | 50 |
| 30/14 HRA | HRA 30/14 F surf HRA 30/14 C surf | 35 | 40 | 50 |
| 35/14 HRA | HRA 35/14 F surf HRA 35/14 C surf | 45 | 50 | 60 |
| 6 mm SMA | SMA 6 surf | 15 | 20-40 | 45 |
| 10 mm SMA | SMA 10 surf | 20 | 25-50 | 55 |
| 14 mm SMA | SMA 14 surf | 30 | 35-50 | 55 |
| 50/20 HRA BC | HRA 50/20 bin | 40 | 45-80 | 100 |
| 60/20 HRA BC | HRA 60/20 bin | 40 | 45-80 | 100 |
| 14 mm SMA BC | SMA 14 bin | 25 | 30-60 | 65 |
| 20 mm SMA BC | SMA 20 bin | 40 | 50-100 | 110 |
| 20 mm DBC | AC 20 dense bin | 40 | 50-100 | 110 |

Based on knowledge of:
the reinstatement material type
the compaction device and
the depth of the reinstatement
the reinstater can determine from the guidelines how many lifts and compaction passes are required to potentially comply with the prescribed air voids content. For example for a footway reinstatement of 60 mm depth using 6 mm SMA two lifts are required, with each lift being compacted by 5 passes with a Vibrotamper (50 kg minimum) in order to achieve the necessary 2-10% air voids content.

In practice, a reinstater's judgement, skill, experience and knowledge can affect the quality of a reinstatement. A reinstater is required to pour out an appropriate amount of material for a lift. The material surcharge, that is, the surplus of material before compaction in order to achieve an intended compacted thickness, can be quantified as a % surcharge relative to the intended compacted thickness. Typically only relatively vague guidance is available for such surcharges (e.g. 20-50%), and compliance with air voids requirements is not enabled. The applicable surcharge levels vary for different material types. In practice a reinstater determines an appropriate amount of material for a lift largely by eye and based on experience, and ensures that the material is evenly laid by raking and measuring. Errors can cause portions of a reinstatement, or even a whole reinstatement, to fall outside the required air voids content range, and result in a poor quality of the reinstatement. Some estimates indicate that up to 25% of all reinstatements do not comply with air voids content requirements, and are at an increased risk of failure.

After reinstatement the quality of the reinstatement may only become apparent some time later. Determining whether the actual air voids content complies with the requirement is not typically possible for the reinstater on site, as it conventionally involves taking a sample of the surface and analysing it in a laboratory. The occurrence of a reinstatement with inadequate quality may go unnoticed at the time the reinstatement is made, when corrections could be made with relative ease.

It is an aim of the present invention to provide a method of reinstatement, apparatus for reinstatement and a system for reinstatement which at least alleviates some of these problems.

According to a first aspect there is provided a system for processing a pavement reinstatement, the system comprising: a weighing apparatus for measuring a mass of reinstatement material; and a reinstatement apparatus adapted to receive reinstatement dimension information and reinstatement material information and adapted to determine a required reinstatement material mass, whereby to provide a target air voids content of the reinstatement. Optionally the reinstatement apparatus is adapted to receive an indication of the mass measured by the weighing apparatus and optionally the indication is a verification of the weighing apparatus having measured the required mass. By determining the required reinstatement material mass based on the reinstatement dimension information and the reinstatement material information more accurate achievement of the target air voids content can be achieved and more reliable compliance with air voids content requirements can be achieved. The reinstatement material is preferably a bituminous material.

For simplicity the reinstatement dimension information may include a length and a width. The reinstatement apparatus may be adapted to determine a reinstatement surface area from the length and width. For versatility the reinstatement dimension information may include reinstatement shape information and one or more dimension values. The reinstatement apparatus may be adapted to determine a reinstatement surface area from the reinstatement shape information and the one or more dimension values. For accuracy the reinstatement shape information may be in the form of a shape selection from a shape list, a user input shape schematic, or a photograph.

For accuracy the reinstatement dimension information may include one or more depth values. For simplicity the reinstatement apparatus may be adapted to determine a representative depth value from the one or more depth values. The representative depth value may be an average depth value or a median depth value. For accuracy the reinstatement dimension information may include depth profile information.

The reinstatement apparatus is preferably adapted to determine a reinstatement volume from the reinstatement surface area as aforementioned and a depth value or representative depth value as aforementioned. For ease of use the reinstatement volume may be determined further in dependence on an item located within the reinstatement. The item may be a lid, a stop tap, a fire hydrant, a meter housing or a drain housing.

For convenience the reinstatement apparatus may be adapted to determine a maximum theoretical density from the reinstatement material information. The maximum theoretical density may be a representative maximum theoretical density from a range of known maximum theoretical densities.

For convenience the reinstatement apparatus may be adapted to determine the target air voids content of the reinstatement from the reinstatement material information. The target air voids content may be a representative target air voids content from a range of permitted target air voids contents.

Preferably the reinstatement apparatus determines the required reinstatement material mass from the reinstatement volume as aforementioned, from the target air voids content optionally as aforementioned and from the maximum theoretical density as aforementioned. Preferably the reinstatement apparatus determines the required reinstatement material mass according to the following formula:

required material mass=reinstatement volume×maximum theoretical density×(1−(target air voids content [%]/100)).

For effectiveness the reinstatement apparatus may be further adapted to determine an actually used reinstatement material mass based on the mass measured by the weighing apparatus. For accuracy the reinstatement apparatus may be further adapted to receive an indication of an unused portion of the mass measured by the weighing apparatus and to determine the actually used reinstatement material mass further based on the unused portion. For effectiveness the reinstatement apparatus may be further adapted to determine an estimated actual air voids content of the reinstatement based on the actually used reinstatement material mass. For convenience the reinstatement apparatus may be further adapted to provide an indication of whether the estimated actual air voids content falls within a range of permitted target air voids contents.

For efficiency the reinstatement apparatus may be further adapted to determine a number of lifts for the reinstatement, optionally in dependence on compaction equipment. The reinstatement apparatus may be further adapted to divide the required reinstatement material mass into a number of lifts for the reinstatement. For ease of handling the reinstatement apparatus may be further adapted to divide the required reinstatement material mass (optionally per lift) into a number of loads of reinstatement material, optionally in dependence on a maximum load per receptacle.

The reinstatement may comprise a first layer of a first material and a second layer of a second material. The reinstatement apparatus may be adapted to determine a required first reinstatement material mass and a required second reinstatement material mass in order to provide a first target air voids content of the first layer and a second target air voids content of the second layer. The first material may be a binder material and the second material may be a surface material.

For versatility the reinstatement apparatus may be further adapted to receive further information in relation to the reinstatement. The further information may relate to one or more of the following: a pavement type; a road type; a footway type; a reinstatement location; a date; a time; a duration of work; a weather condition; a user identification; site information; a photograph; compaction equipment; a compaction procedure; a reinstatement material temperature; a sub-base material; a binder material; a surface material, a binder layer depth; a surface layer depth; a compaction duration; a compaction vibration frequency; and a reinstatement identification.

For accuracy and reliability the reinstatement apparatus and the weighing apparatus may comprise communication modules for communicating with each other for transmission of the indication of the mass measured by the weighing apparatus and/or the required reinstatement material mass.

For accuracy and reliability the system may further comprise a thermometer for measuring a temperature of reinstatement material. The reinstatement apparatus may receive an indication of a temperature measured by the thermometer. The indication may be a verification of the thermometer having measured a required temperature. The reinstatement apparatus and the thermometer may comprise communication modules for communicating with each other for transmission of the indication of the temperature measured by the thermometer and/or for transmission of an indication of a required temperature.

For accuracy and reliability the system may further comprise a compaction measurement system for measuring compaction information. The compaction measurement system may be a compaction vibration measurement system. The reinstatement apparatus may receive compaction information measured by the compaction measurement system. The information may be a verification of the compaction measurement system having measured a required compaction. The reinstatement apparatus and the compaction measurement system may comprise communication modules for communicating with each other for transmission of the compaction information measured by the compaction measurement system and/or for transmission of an indication of a required compaction.

For accuracy and reliability the system may further comprise a measuring apparatus for determining dimension information. The reinstatement apparatus may receive dimension information determined by the measuring apparatus. The measuring apparatus may be a digital tape measure, an infrared dimension measuring device, an ultrasound distance measuring device, a laser distance measuring device, or a laser scan system. The reinstatement apparatus and the measuring apparatus may comprise communication modules for communicating with each other for transmission of the dimension information determined by the measuring apparatus.

For reliability the system may further comprise a reinstatement identification tag for identifying the reinstatement. The reinstatement identification tag may be an RFID tag for embedding in the reinstatement.

The reinstatement apparatus may be further adapted to transmit a record of the reinstatement to a data store. The record preferably includes an estimated actual air voids content as aforementioned for the reinstatement. For reliability a reinstatement identification tag optionally as aforementioned may provide a unique identifier of the reinstatement in the record.

The system may further comprise a data store adapted to receive a record of the reinstatement as aforementioned. The data store may be adapted to receive a query in respect of a reinstatement and to provide information in relation to the reinstatement on the basis of the record. The system may further comprise an auditing apparatus adapted to submit a query in respect of a reinstatement to the data store and to receive information in relation to the reinstatement. This can enable widespread use of the information recorded by the reinstatement apparatus.

According to another aspect there is provided apparatus for processing a pavement reinstatement, wherein the reinstatement apparatus is adapted to receive reinstatement dimension information and reinstatement material information and adapted to determine a required reinstatement material mass in order to provide a target air voids content of the reinstatement. By determining the required reinstatement material mass based on the reinstatement dimension information and the reinstatement material information more accurate achievement of the target air voids content can be achieved and more reliable compliance with air voids content requirements can be achieved. The reinstatement material is preferably a bituminous material.

For simplicity the reinstatement dimension information may include a length and a width. The reinstatement apparatus may be adapted to determine a reinstatement surface area from the length and width. For versatility the reinstatement dimension information may include reinstatement shape information and one or more dimension values. The reinstatement apparatus may be adapted to determine a reinstatement surface area from the reinstatement shape information and the one or more dimension values. For accuracy the reinstatement shape information may be in the form of a shape selection from a shape list, a user input shape schematic, or a photograph.

For accuracy the reinstatement dimension information may include one or more depth values. For simplicity the reinstatement apparatus may be adapted to determine a representative depth value from the one or more depth values. The representative depth value may be an average depth value or a median depth value. For accuracy the reinstatement dimension information may include depth profile information.

The reinstatement apparatus is preferably adapted to determine a reinstatement volume from the reinstatement surface area as aforementioned and a depth value or representative depth value as aforementioned. For ease of use the reinstatement volume may be determined further in dependence on an item located within the reinstatement. The item may be a lid, a stop tap, a fire hydrant, a meter housing or a drain housing.

For convenience the reinstatement apparatus may be adapted to determine a maximum theoretical density from the reinstatement material information. The maximum theoretical density may be a representative maximum theoretical density from a range of known maximum theoretical densities.

For convenience the reinstatement apparatus may be adapted to determine the target air voids content of the reinstatement from the reinstatement material information. The target air voids content may be a representative target air voids content from a range of permitted target air voids contents.

Preferably the reinstatement apparatus determines the required reinstatement material mass from the reinstatement volume as aforementioned, from the target air voids content optionally as aforementioned and from the maximum theoretical density as aforementioned. Preferably the reinstatement apparatus determines the required reinstatement material mass according to the following formula:

required material mass=reinstatement volume×maximum theoretical density×(1−(target air voids content [%]/100)).

For accuracy the reinstatement apparatus may be adapted to receive an indication of a mass of reinstatement material measured by a weighing apparatus. The indication may be a verification of the weighing apparatus having measured the required mass of reinstatement material. For effectiveness the reinstatement apparatus may be adapted to determine an actually used reinstatement material mass based on the mass measured by the weighing apparatus. For accuracy the reinstatement apparatus may be adapted to receive an indication of an unused portion of the mass measured by the weighing apparatus and to determine the actually used reinstatement material mass further based on the unused portion. For effectiveness the reinstatement apparatus may be adapted to determine an estimated actual air voids content of the reinstatement based on the actually used reinstatement material mass. For convenience the reinstatement apparatus may be adapted to provide an indication of whether the estimated actual air voids content falls within a range of permitted target air voids contents.

For efficiency the reinstatement apparatus may be adapted to determine a number of lifts for the reinstatement, optionally in dependence on compaction equipment. The reinstatement apparatus may be adapted to divide the required reinstatement material mass into a number of lifts for the reinstatement. For ease of handling the reinstatement apparatus may be adapted to divide the required reinstatement material mass (optionally per lift) into a number of loads of reinstatement material, optionally in dependence on a maximum load per receptacle.

The reinstatement may comprise a first layer of a first material and a second layer of a second material. The reinstatement apparatus may be adapted to determine a required first reinstatement material mass and a required second reinstatement material mass in order to provide a first target air voids content of the first layer and a second target air voids content of the second layer. The first material may be a binder material and the second material may be a surface material.

For versatility the reinstatement apparatus may be adapted to receive further information in relation to the reinstatement. The further information may relate to one or more of the following: a pavement type; a road type; a footway type; a reinstatement location; a date; a time; a duration of work; a weather condition; a user identification; site information; a photograph; compaction equipment; a compaction procedure; a reinstatement material temperature; a sub-base material; a binder material; a surface material, a binder layer depth; a surface layer depth; a compaction duration; a compaction vibration frequency; and a reinstatement identification.

For accuracy and reliability the reinstatement apparatus may comprise a communication module for communicating with weighing apparatus to receive an indication of a mass measured by the weighing apparatus and/or to send an indication of the required reinstatement material mass.

For accuracy and reliability the reinstatement apparatus may comprise a communication module for communicating with a thermometer to receive an indication of a temperature measured by the thermometer and/or to send an indication of a required temperature. The thermometer may be for measuring a temperature of reinstatement material. The indication may be a verification of the thermometer having measured a required temperature.

For accuracy and reliability the reinstatement apparatus may comprise a communication module for communicating with a compaction measurement system to receive compaction information measured by the compaction measurement system and/or to send an indication of a required compaction. The compaction measurement system may be for measuring compaction of the reinstatement. The compaction measurement system may be a compaction vibration measurement system. The information may be a verification of the compaction measurement system having measured a required compaction.

For accuracy and reliability the reinstatement apparatus may comprise a communication module for communicating with a measuring apparatus to receive dimension information determined by the measuring apparatus. The measuring apparatus may be a digital tape measure, an infrared dimension measuring device, an ultrasound distance measuring device, a laser distance measuring device, or a laser scan system.

The reinstatement apparatus may be adapted to transmit a record of the reinstatement to a data store. The record preferably includes an estimated actual air voids content as aforementioned for the reinstatement. For reliability the reinstatement record may comprise a unique identifier associated with a reinstatement identification tag. For reliability the reinstatement identification tag may be an RFID tag for embedding in the reinstatement.

According to another aspect there is provided a system comprising a receptacle for receiving reinstatement material and a weighing apparatus for measuring a mass of reinstatement material received in the receptacle. The weighing apparatus may be adapted to provide an indication of the mass measured by the weighing apparatus. The weighing apparatus may be adapted to receive an indication of a required reinstatement material mass. The weighing apparatus may comprise a communication module for communicating with a reinstatement apparatus (optionally as aforementioned) for receiving an indication of a required mass and/or for submitting an indication of the mass measured by the weighing apparatus. By providing a receptacle and a weighing apparatus a required mass of reinstatement material can be provided accurately and reliably. The reinstatement material is preferably a bituminous material.

For ease of use the weighing apparatus may be integrated in the receptacle. The receptacle may be a wheel barrow or a hot box.

According to another aspect there is provided a method of processing a pavement reinstatement, the method comprising determining a required reinstatement material mass from reinstatement dimension information and from reinstatement material information in order to provide a target air voids content of the reinstatement. By determining the required reinstatement material mass based on the reinstatement dimension information and the reinstatement material information more accurate achievement of the target air voids content can be achieved and more reliable compliance with air voids content requirements can be achieved. The reinstatement material is preferably a bituminous material.

For simplicity the reinstatement dimension information may include a length and a width. The method may comprise determining a reinstatement surface area from the length and width. For versatility the reinstatement dimension information may include reinstatement shape information and one or more dimension values. The method may comprise determining a reinstatement surface area from the reinstatement shape information and the one or more dimension values. For accuracy the reinstatement shape information may be in the form of a shape selection from a shape list, a user input shape schematic, or a photograph.

For accuracy the reinstatement dimension information may include one or more depth values. For simplicity the method may comprise determining a representative depth value from the one or more depth values. The representative depth value may be an average depth value or a median depth value. For accuracy the reinstatement dimension information may include depth profile information.

The method may comprise determining a reinstatement volume from the reinstatement surface area as aforementioned and a depth value or representative depth value as aforementioned. For ease of use the reinstatement volume may be determined further in dependence on an item located within the reinstatement. The item may be a lid, a stop tap, a fire hydrant, a meter housing or a drain housing.

For convenience the method may comprise determining a maximum theoretical density from the reinstatement material information. The maximum theoretical density may be a representative maximum theoretical density from a range of known maximum theoretical densities.

Preferably the method comprises determining the required reinstatement material mass from the reinstatement volume as aforementioned, from the target air voids content optionally as aforementioned and from the maximum theoretical density as aforementioned. Preferably the reinstatement apparatus determines the required reinstatement material mass according to the following formula:

$$\text{required material mass} = \text{reinstatement volume} \times \text{maximum theoretical density} \times (1 - (\text{target air voids content } [\%]/100)).$$

For accuracy the method may comprise receiving an indication of a mass of reinstatement material measured by a weighing apparatus. The indication may be a verification of the weighing apparatus having measured the required mass of reinstatement material. For effectiveness the method may comprise determining an actually used reinstatement material mass based on the mass measured by the weighing apparatus. For accuracy the method may comprise receiving an indication of an unused portion of the mass measured by the weighing apparatus and determining the actually used reinstatement material mass further based on the unused portion. For effectiveness the method may comprise determining an estimated actual air voids content of the reinstatement based on the actually used reinstatement material mass. For convenience the method may comprise providing an indication of whether the estimated actual air voids content falls within a range of permitted target air voids contents.

For efficiency the method may comprise determining a number of lifts for the reinstatement, optionally in dependence on compaction equipment. The method may comprise dividing the required reinstatement material mass into a number of lifts for the reinstatement. For ease of handling the method may comprise dividing the required reinstatement material mass (optionally per lift) into a number of loads of reinstatement material, optionally in dependence on a maximum load per receptacle.

The reinstatement may comprise a first layer of a first material and a second layer of a second material. The method may comprise determining a required first reinstatement material mass and a required second reinstatement material mass in order to provide a first target air voids content of the first layer and a second target air voids content of the second layer. The first material may be a binder material and the second material may be a surface material.

For versatility the method may comprise receiving further information in relation to the reinstatement. The further information may relate to one or more of the following: a pavement type; a road type; a footway type; a reinstatement location; a date; a time; a duration of work; a weather condition; a user identification; site information; a photograph; compaction equipment; a compaction procedure; a reinstatement material temperature; a sub-base material; a binder material; a surface material, a binder layer depth; a surface layer depth; a compaction duration; a compaction vibration frequency; and a reinstatement identification.

For accuracy and reliability the method may comprise communicating with weighing apparatus to receive an indication of a mass measured by the weighing apparatus and/or to send an indication of the required reinstatement material mass.

For accuracy and reliability the method may comprise communicating with a thermometer to receive an indication of a temperature measured by the thermometer and/or to send an indication of a required temperature. The thermometer may be for measuring a temperature of reinstatement material. The indication may be a verification of the thermometer having measured a required temperature.

For accuracy and reliability the method may comprise communicating with a compaction measurement system to receive compaction information measured by the compaction measurement system and/or to send an indication of a required compaction. The compaction measurement system may be for measuring compaction of the reinstatement. The compaction measurement system may be a compaction vibration measurement system. The information may be a verification of the compaction measurement system having measured a required compaction.

For accuracy and reliability the method may comprise communicating with a measuring apparatus to receive dimension information determined by the measuring apparatus. The measuring apparatus may be a digital tape measure, an infrared dimension measuring device, an ultrasound distance measuring device, a laser distance measuring device, or a laser scan system.

The method may comprise transmitting a record of the reinstatement to a data store. The record preferably includes an estimated actual air voids content as aforementioned for the reinstatement. For reliability the reinstatement record may comprise a unique identifier associated with a reinstatement identification tag. For reliability the reinstatement identification tag may be an RFID tag for embedding in the reinstatement.

According to another aspect there is provided a pavement reinstatement processed according to the method as aforementioned.

The invention extends to a reinstatement apparatus substantially as herein described and/or as illustrated with reference to the figures. The invention also extends to a reinstatement system substantially as herein described and/or as illustrated with reference to the figures. The invention also extends to a reinstatement method substantially as herein described and/or as illustrated with reference to the figures.

The invention also provides a computer program or a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program or a computer program product for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

Any feature in one aspect of the invention may be applied to other aspects of the invention, in any appropriate combination. In particular, method aspects may be applied to apparatus aspects, and vice versa. As used herein, means plus function features may be expressed alternatively in terms of their corresponding structure, such as a suitably programmed processor and associated memory.

Furthermore, features implanted in hardware may generally be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

These and other aspects of the present invention will become apparent from the following exemplary embodiments that are described with reference to the following figures in which:

FIGS. 3 to 10 show different displays of a user input interface for reinstatement apparatus;

FIG. 1 shows apparatus 10 for reinstatement for more accurate compliance with air voids content requirements. The reinstater provides input information determining:

Figure 1:
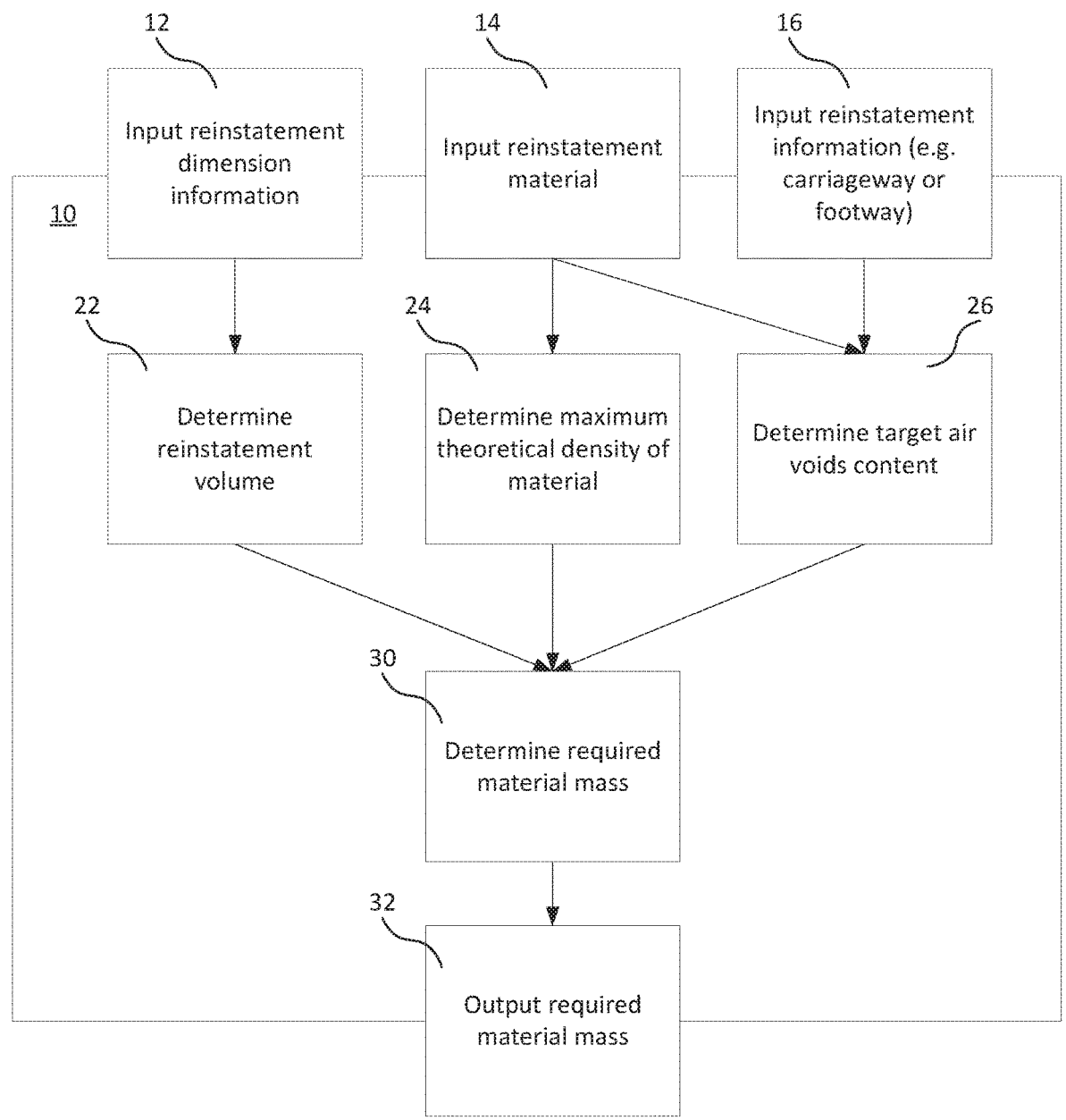
FIG. 1 shows reinstatement apparatus.

the reinstatement dimensions 12; and the reinstatement material 14.

Optionally the reinstater can provide input information determining additional reinstatement information 16, such as whether the reinstatement is for a carriageway or a footpath.

The reinstatement apparatus 10 determines the reinstatement volume 22 based on the reinstatement dimension information 12. The reinstatement apparatus 10 determines the maximum theoretical density 24 (MTD) of the reinstatement material 14. The reinstatement apparatus 10 determines the target air voids content 26 for the reinstatement based on the reinstatement material 14 and optionally the additional reinstatement information 16. The reinstatement apparatus 10 determines the material mass 30 that is required for the reinstatement in order to fill the given volume with the given material having the target air voids content. The reinstatement apparatus 10 provides as output to the reinstater the required material mass 32.

The required material mass 30 is calculated as follows:

required material mass [kg]=volume of reinstatement [m$^3$]×maximum theoretical density [kg/m$^3$]×(1−(target air voids [%]/100))

For example for a carriageway reinstatement with reinstatement dimensions 12 of 2.5 m×0.9 m×0.065 m using as reinstatement material 14 AC 6 mm DSC the reinstatement apparatus 10 determines:

the reinstatement volume 22 is 2.5 m×0.9 m×0.065 m=0.15 m$^3$ the maximum theoretical density 24 of AC 6 mm DSC is 2460 kg/m$^3$ (from a look-up table)

the target air voids content 26 for AC 6 mm DSC is 5% (from a look-up table)

Based on these values, the required material mass 30 is 0.15 m$^3$×2460 kg/m$^3$×0.95=351 kg. The reinstater can measure out the necessary 351 kg, compact it evenly in the opening until the reinstatement is flush with the surrounding pavement, and the reinstatement can be presumed compliant with the air voids requirement with better reliability than when prepared according to conventional procedures. Because the correct amount of material is known to have been used to achieve the required air voids content for the given cavity, the compaction can be assumed complete when the reinstatement is flush with the surrounding pavement, and the guidelines regarding number of passes can be ignored. For the same reason it may not be necessary to reinstate in multiple lifts; greater depths than conventionally acceptable can be reinstated in a single lift, as once the reinstatement is flush with the surrounding pavement the reinstatement can be expected to be compliant with the air voids requirement.

Optionally the conventional compaction procedures can be followed in addition. The reinstatement apparatus 10 can determine (e.g. from a look-up table) a number of lifts required based on the reinstatement material and the reinstatement depth, and a number of compaction passes based on the reinstatement depth (or compacted lift thickness if two or more lifts are required).

The required material mass 30 can be divided over a number of lifts, e.g. to provide multiple lifts of even thickness. For even compaction throughout the depth of the reinstatement it may be advantageous to reinstate in multiple lifts, especially if the reinstatement depth is relatively large.

In the example illustrated above, the maximum lift thickness for AC 6 mm DSC is 40 mm, so in order to fill the reinstatement depth of 65 mm two lifts are required. The required material mass per lift is half the total required material mass 30, so 175.5 kg. Using a >1400 kg/m$^2$ vibrating plate compacter six compaction passes are required for each lift (compacted lift thickness: 32.5 mm). The reinstatement apparatus 10 can provide indications of the required material mass per lift for a number of lifts, as well as indications of the numbers of compaction passes per lift in dependence on compaction equipment.

The operations performed by the reinstatement apparatus 10 are now considered in greater detail.

In the example illustrated above, the target air voids value is 5%. The guidelines specify an allowable air voids range, e.g. 2-13%. The target air voids value is selected from within the allowable range, in order to optimise the probability of compliance when other factors are taken into account (such as the maximum theoretical density as discussed below). In another example a target air voids value of 6% is selected. In another example a target air voids value of 7.5%, at the middle of an allowable range of 2-13%, is selected.

The maximum theoretical density 24 (MTD) of the reinstatement material 14 is the density of the reinstatement material when it has 0% air voids. The materials used for reinstatement can be measured to determine the appropriate MTD value. For example AC 6 mm DSC 100/150 typically has a MTD from around 2400 kg/m$^3$ to 2550 kg/m$^3$.

The precise composition (aggregates, bitumen, fillers etc.) of reinstatement material can vary depending for example on source and batch, and accordingly the MTD of the reinstatement material can vary within a range. In order to ensure that a reinstatement is compliant with the air voids requirement, which also fall within a range, a representative MTD is used such that even if the actual MTD of the reinstatement material (which may be unknown to the reinstater) differs from the representative MTD, the air voids requirement is within an acceptable range.

For example, the air voids requirement for AC 6 mm DSC (footway) is given by a range of 2-13%. In the example calculation of the required material mass above, the nominal target air voids of 5% is selected and a representative MTD of 2460 kg/m$^3$ is used. If in that example the actual (unknown) MTD of the reinstatement material is not 2460 kg/m$^3$ but 2400 kg/m$^3$, then the reinstatement has an actual air voids content of 3% instead of 5%. If the actual MTD of the reinstatement material is not 2460 kg/m$^3$ but 2550 kg/m$^3$, then the reinstatement has an actual air voids content of 9% instead of 5%. Both actual air voids contents are within the allowable range of 2-13%.

The representative MTD used in the calculation is generally fixed for a given material, and may be determined from a number of actual MTD values from a number of actual samples, e.g. an average value or a median value. Alternatively, the representative MTD may be provided by a manufacturer of the material. The representative MTD used in the calculation may ensure that the range of expected actual air voids content values falls within a target air voids content range (e.g. within the 2-13% range in the example discussed above, or within a range centred around a midpoint of an acceptable range, e.g. centred around 7.5%). In a less preferred variant, the representative MTD is selected, for example based on the choice of a nominal target air voids (e.g. 5%, or 7.5%).

In a further variant, the (actual) MTD of the material used for reinstatement is measured, and the measured MTD is used as an input into the reinstatement apparatus 10. In a further variant, the maximum density (including a certain air void content) of the material is measured, and the measured maximum density is used as an input into the reinstatement apparatus 10.

The reinstatement dimension information 12 can be provided by the reinstater based on values obtained by the reinstater measuring a cavity (a pavement opening that is to be reinstated). For a simple rectangular cuboid, cavity length, width and depth provide sufficient reinstatement dimension information 12 to determine the reinstatement volume 22. For a cavity with a more complex shape, additional information may be required. In a variant an input is provided to enable user input of a cavity shape and add dimension information until the cavity volume is specified.

Figure 2:
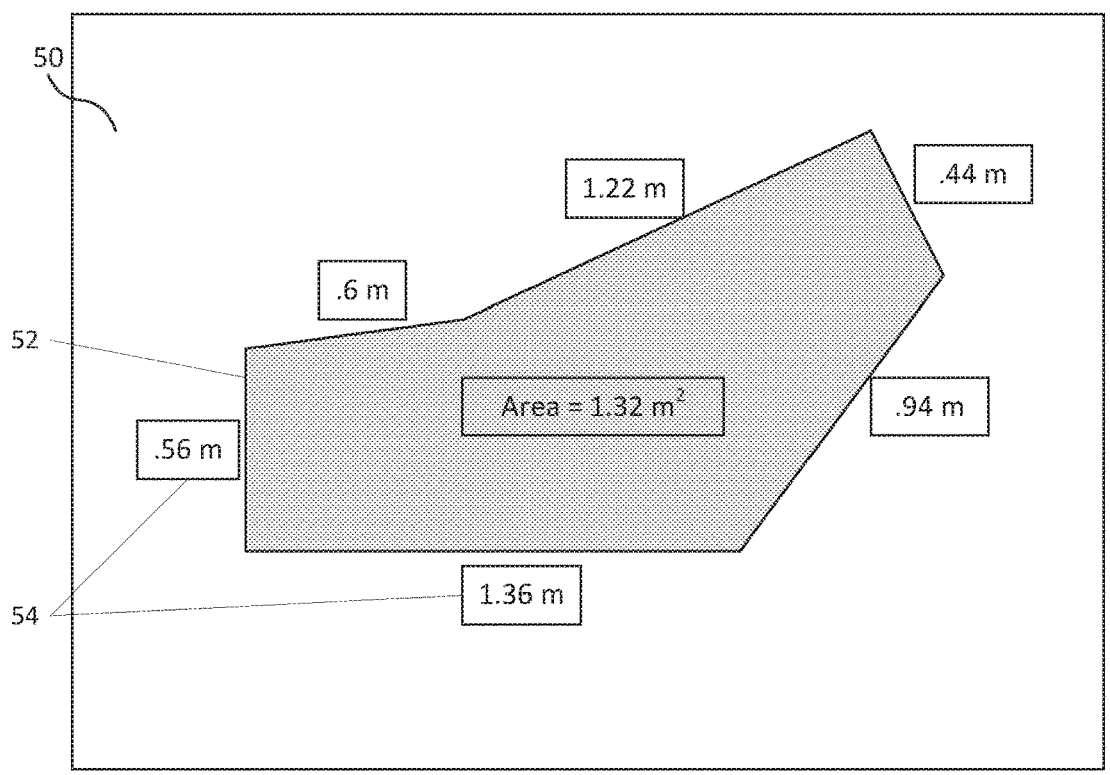
FIG. 2 shows a user input interface for shape and dimension input.

FIG. 2 shows an example of a user input interface 50 where, in a variant, the user can draw a shape 52 of a cavity and add dimension information. Software that can provide this functionality is readily available. From the given information the reinstatement apparatus 10 can determine the area of the shape. For dimension information the length of edges is preferred, as this is more convenient to measure than for example angles or perpendiculars.

In a further variant a user input can comprise a photograph of a cavity together with an indication of a dimension value to provide scale. An image recognition module can extract the shape information, and together with the dimension value the area of the shape can be determined. Mobile scanning technology may alternatively be used to provide shape and/or dimension information.

The cavity depth is typically approximately uniform for reinstatements. Because a cavity may not have precisely uniform depth, for precision a number of individual depth measurement values may be input by the user and an average or median calculated in order to determine a representative depth. The user input can also be adapted to accommodate input of depth profile and depth information and determine the volume accordingly.

A user input further comprises an indication of standard items (if present) located in the shape boundary, for example apparatus such as a lid, a stop tap, a fire hydrant, a drain housing, or a standard structure such as a chamber that is used to house meters.

FIGS. 3 to 10 show for an example of the reinstatement apparatus 10 different displays of a user input interface 100 for user input of the required information and output of information relating to the required material mass. In this example the reinstatement apparatus 10 is adapted for reinstatement of a footway (type 1).

Figure 3:
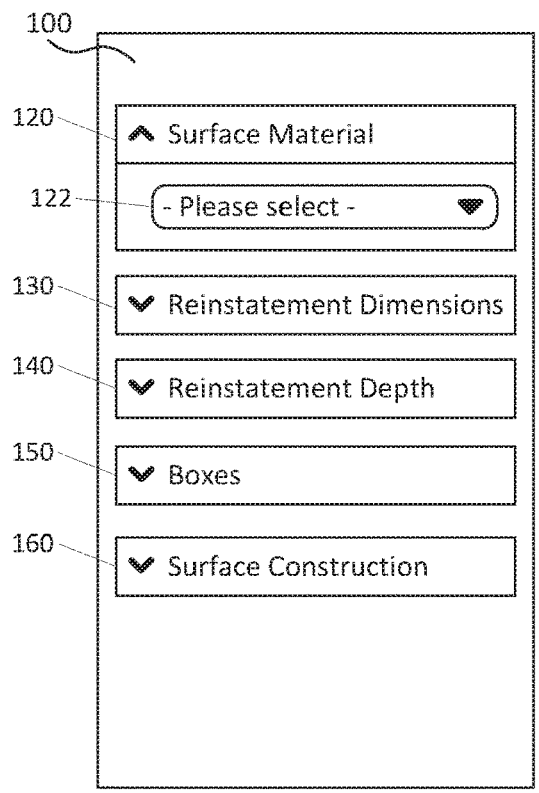

FIG. 3 shows a user input interface 100 with the following drop-down fields:
Surface Material 120
Reinstatement Dimensions 130
Reinstatement Depth 140
Boxes 150
Surface Construction 160
The available fields are illustrated in FIGS. 4-8.

Figure 4:
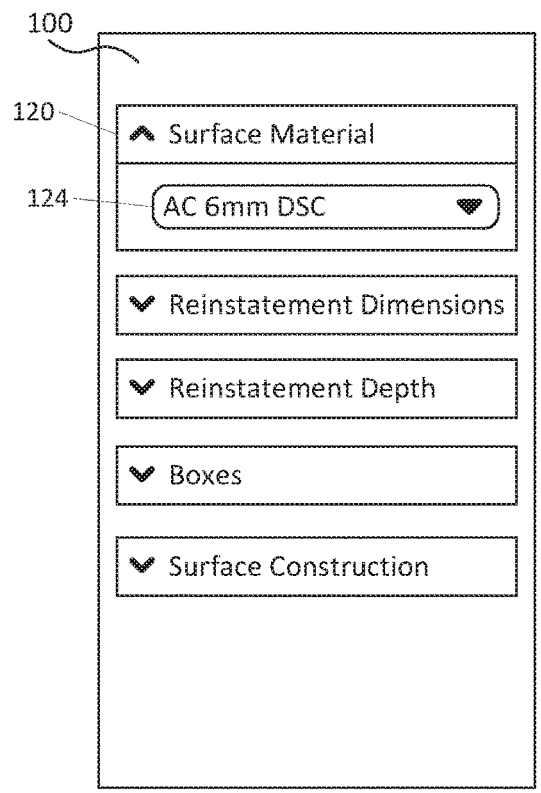

In FIG. 3 the drop-down field 'Surface Material' 120 is shown with a drop-down menu 122 listing a number of possible reinstatement materials. In FIG. 4 a reinstatement material selection 124 is indicated, in the illustrated example AC 6 mm DSC. A further drop-down menu may be provided listing a number of possible roadway and footway types. The reinstatement apparatus 10 determines the target air voids content and the representative MTD for the selected material.

Figures 5, 6, 7, 8:
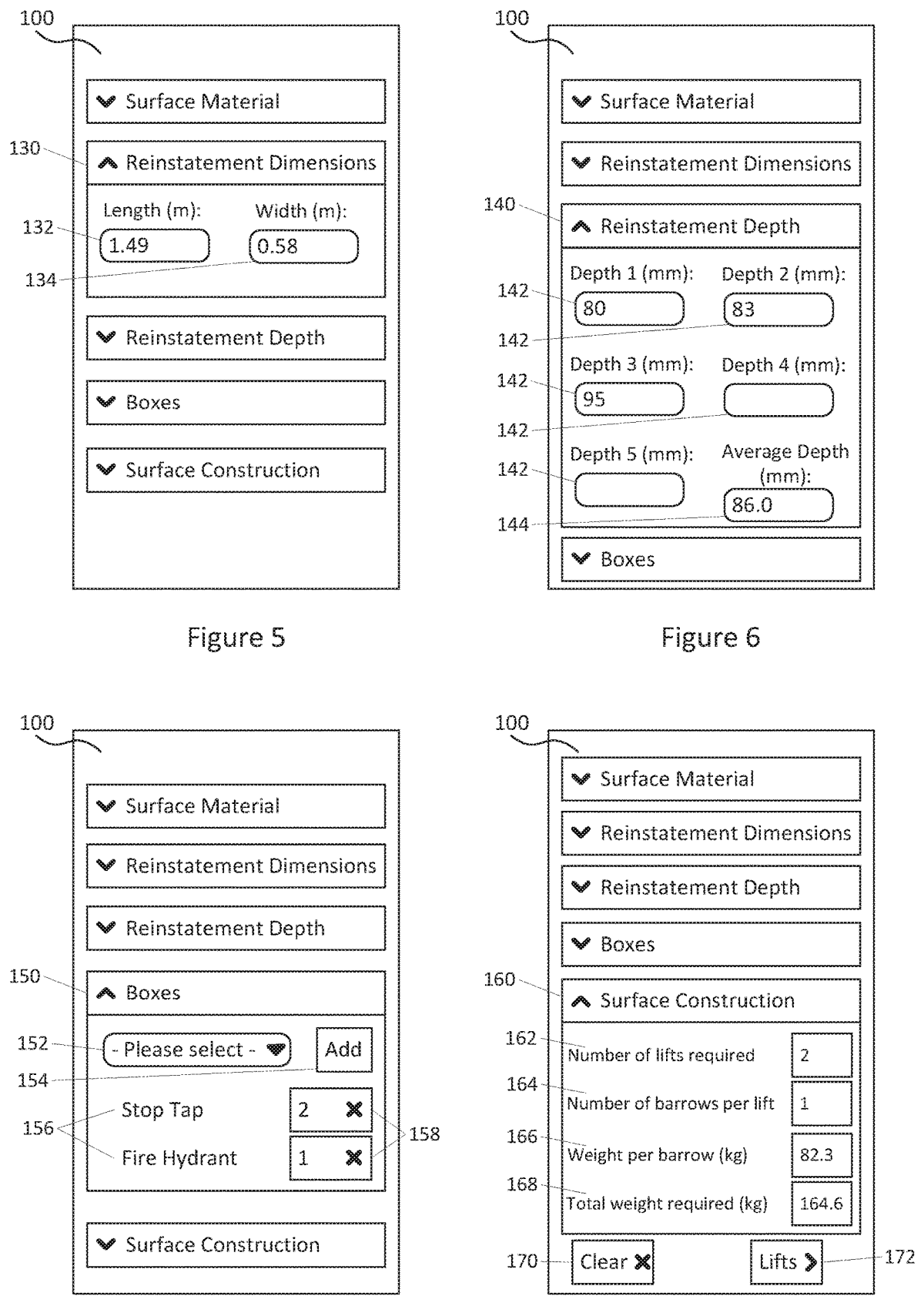

In FIG. 5 the drop-down field 'Reinstatement Dimensions' 130 is shown with an input field 132 for a length of a rectangular shaped cavity and an input field 134 for a width of a rectangular shaped cavity. In the illustrated example the rectangular cavity is 1.49 m long and 0.58 m wide. For user input of values a keypad may be provided, or increase/decrease buttons, or a drop-down menu of values, or other conventionally used input methods. In a variant input of values may be by way or receiving measurements from an external device, such as an infrared measuring device. In a variant a field may enable specification of different cavity shapes, e.g. square/rectangle/L-shape/T-shape, with an appropriate number of input fields shown to specify dimension values depending on the shape selection. From the reinstatement dimension information the reinstatement apparatus 10 determines the surface area of the reinstatement cavity.

In FIG. 6 the drop-down field 'Reinstatement Depth' 140 is shown with five input fields 142 for individual cavity depth measurement values and a field 144 displaying an average depth value calculated from the inputs. In the illustrated example three depth measurement values are input and the average depth is indicated as 86 mm. With the reinstatement depth information the reinstatement apparatus 10 determines the volume of the reinstatement cavity. The reinstatement apparatus 10 also determines a number of lifts based on the reinstatement depth information.

In a variant the reinstatement apparatus 10 determines (e.g. from a look-up table) whether the depth values (e.g. the average depth, or any of the input depth measurement values) are unacceptable, for example if the reinstatement depth is too small for the selected type of reinstatement, and provides an indication of whether or not the depth is sufficient. For example for a footway type 1 on a non-concrete sub-base, a minimum depth of 60 mm is required, and if the user enters a depth of 50 mm then an indication of the depth being too small is provided.

In FIG. 7 the drop-down field 'Boxes' 150 is shown with a drop-down menu 152 listing a number of possible apparatus located within the cavity (e.g. stop tap/fire hydrant/drain housing/meter housing), a button 154 for indicating inclusion of a selected apparatus, and a summary indicating apparatus type 156 and quantity 158 added by the user. The reinstatement apparatus 10 determines the volume occupied by the selected apparatus (e.g. from a look-up table) and adjusts the reinstatement volume accordingly.

In FIG. 8 the drop-down field 'Surface Construction' 160 is shown with the output from the reinstatement apparatus 10 based on the user input provided. The output includes summary indicating a number of lifts required 162 (in the illustrated example: two), a number of barrows per lift 164 (in the illustrated example: one), a weight per barrow 166 (in the illustrated example: 82.3 kg), and a total weight required 168 (in the illustrated example: 164.6 kg). These values are as determined by the reinstatement apparatus 10 in dependence on the information received from the user. A 'Clear' button 170 is shown for clearing the user inputs, and a 'Lifts' button 172 is shown for monitoring the reinstatement as actually made.

Figure 9:
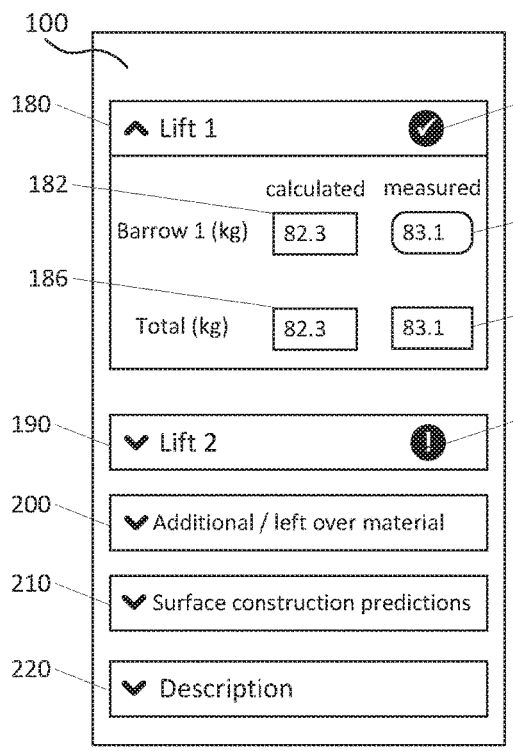

FIG. 9 shows the user input interface 100 after selection of the 'Lifts' button 172, with the following drop-down fields for monitoring the reinstatement as actually made:

Lift 1 180
Lift 2 190
Additional/left over material 200
Surface construction predictions 210
Description 220

In FIG. 9 the drop-down field 'Lift 1' 180 is shown with an indication of the mass of reinstatement material required as per the calculations, in relation to the first lift:
for a first barrow 182 (in the illustrated example only one barrow is required, with 82.3 kg); and
a total for all barrows 186 (in the illustrated example only one barrow is required, with 82.3 kg).

The reinstatement apparatus 10 takes a maximum load per wheel barrow, e.g. 100 kg (above which a wheel barrow can become difficult to manoeuvre), into account in order to determine the number of barrows and the load per barrow (e.g. such that the total mass is evenly distributed over a number of barrows with no barrow loaded with more than the maximum load).

A field 184 is provided for user input of the actually measured mass of reinstatement material weighed in the first barrow, and based on the user input an indication 188 of a calculated total for all barrows of the actually measured reinstatement material is provided. The drop down fields for further lifts 190 200 provide analogous indications and input fields for those lifts. A symbol 230 indicates that user input has been provided in relation to a lift, and another symbol 232 indicates that user input is required in relation to a lift.

In the drop-down field 'Additional/left over material' 200 one or more fields are provided for user input of mass of material that was measured out, but subsequently not included in the reinstatement, for example because the material became too cool in the barrow. This permits correction of the mass of material actually used for the reinstatement.

Figure 10:
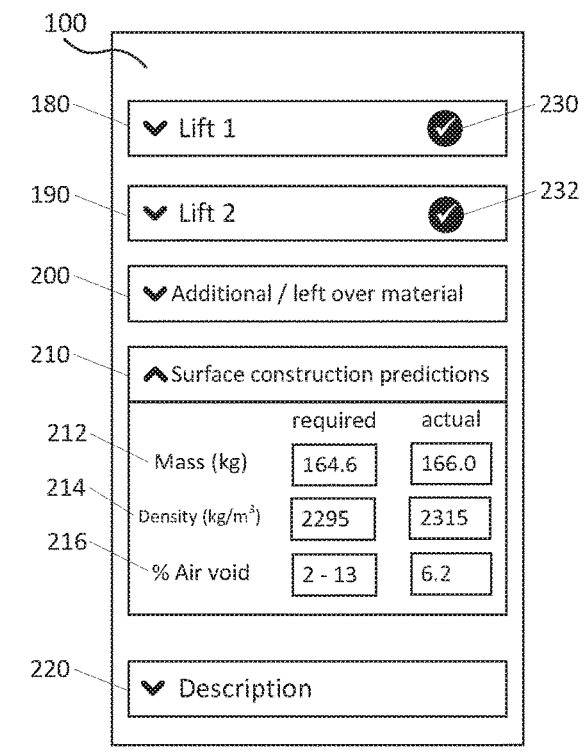

In FIG. 10 the drop-down field 'Surface construction predictions' 210 is shown with indications of the mass 212, density 214 and air voids percentage for the reinstatement. The mass indication 212 shows both the required mass as determined by the calculation, as well as the mass as actually used for the reinstatement as determined from the user inputs (provided these are given in the 'Lift' fields 180 190 200). The density indication 214 shows both the required density as determined by the calculation, as well as the density of the actual reinstatement as estimated based on user inputs. The air voids indication 216 shows the range of allowable air voids for the specified reinstatement, as well as an estimate of the air voids content of the actual reinstatement as based on user inputs.

In the drop-down field 'Description' 220 a field is provided for user input of additional information, for example the address of the reinstatement.

In a variant one or more fields may be provided to enable specification of different information as follows:
   Pavement type (roadway or footway or footpath)
   Roadway or footway or footpath (e.g. road type 0, 1, 2, 3, 4; footway type 1, 2, 3; footpath type 1, 2)
   Reinstatement location
   Date/time
   Duration of work to complete reinstatement
   Weather conditions
   Reinstatement work order or permit number
   Team name or ID
   Site overview photograph
   Completed reinstatement photograph
   Surface compaction equipment; this can permit the reinstatement apparatus 10 to provide indications in relation to the compaction procedure, such as a minimum number of passes per lift or a recommended number of lifts (and the mass of each lift), in dependence on the capabilities of the equipment used. For example, a vibrating plate can only compact material up to a maximum lift depth of 40 mm, but a vibrotamper can compact a lift up to a maximum lift depth of 60 mm. The recommended number of lifts may accordingly be adjusted in dependence on the equipment selected. In another example, if a vibrating plate is used for compaction then three lifts might be appropriate but if a roller is used for compaction then one single lift might be appropriate. Other adaptations of the reinstatement may be made in dependence on the selected compaction equipment.
   Reinstatement material temperature; this can permit the reinstatement apparatus 10 to provide indications of whether temperature requirements are adhered to for the reinstatement
   Sub-base material, e.g. whether or not concrete is beneath the reinstatement; this can permit the reinstatement apparatus 10 to provide indications of whether a minimum reinstatement depth requirement is adhered to for the reinstatement
   Binder material type
   Binder compaction equipment
   Compaction parameters, e.g. vibration frequency and duration; this can permit the reinstatement apparatus 10 to provide an indication of whether or not sufficient compaction has been achieved The reinstatement apparatus 10 may suggest fewer lifts than those suggested by the Code of Practice (as shown in table 4 above). Due to the superior reliability of air voids compliance with the reinstatement apparatus 10 fewer lifts or fewer compaction passes may be required, which can optimise the work required to complete a reinstatement. In an example if a reinstater uses a vibrating plate in a footway reinstatement with a depth of 90 mm, then the reinstatement apparatus 10 suggests three lifts, whereas if a roller is used for compaction of the same reinstatement, then the reinstatement apparatus 10 suggests one lift.

If the area of a reinstatement is greater than a threshold (e.g. 2 m$^2$ for a carriageway) then the reinstatement may be required to be formed of a lower layer of binder material and a surface layer of surface material. The reinstatement apparatus 10 can be adapted to process the binder layer and the surface layer as if each layer were an independent reinstatement as described above. The reinstatement apparatus 10 can for example determine if a binder course is required, and if so to enable input of a binder material (e.g. AC20 mmDBC) as well as a surface material. The reinstatement apparatus 10 can be adapted to determine a binder layer depth and/or a surface layer depth (e.g. from a look-up table based on a total depth), or it can enable input of a binder layer depth and/or a surface layer depth e.g. by user input. Given the binder material and binder layer depth, the mass of the binder material can be determined by the reinstatement apparatus 10 as described above. Given the surface material and surface layer depth, the mass of the surface material can be determined by the reinstatement apparatus 10 as described above.

Some of the abovementioned items of information may be obtained without user input, e.g. dimension information from an infrared measuring device, material information from a bar code associated with a batch of reinstatement material, date and time from a host system, location from an integrated GPS system, temperature from a remote thermometer, weather conditions from a weather information provider, etc. Some of these items of information may be obtained by the user enabling interaction between the reinstatement apparatus 10 and another apparatus such as an infrared measuring device, a remote thermometer, a bar code affixed to compaction equipment, a bar code or RFID tag associated with a batch of reinstatement material, etc.

A log containing the details of a reinstatement (including inputs to and outputs from reinstatement apparatus 10 as well as any other relevant information) may be produced, and saved at the apparatus and/or transmitted to other devices. For example, a log is transmitted to a central data facility where it is kept to record the details of the reinstatement and support compliance of the reinstatement with the requirements and guidelines. Information from the reinstatement apparatus 10 may be correlated or supplemented with further information at the central data facility, for example from independent measurement of actual air voids of a reinstatement (e.g. by non-destructive testing, or by taking a sample of the reinstatement and analysing the sample). At the central data facility the details of completed reinstatements may be mined to extract information for further improvement of the reinstatement apparatus 10.

The central data facility may provide information in respect of a reinstatement to others, for example to an auditor seeking to investigate compliance of a reinstatement with the requirements and guidelines. In an example an auditing tool permits a user to specify a particular reinstatement, and the auditing tool then obtains information from the central data facility regarding that reinstatement, for example the estimated actual air voids content based on the actually used reinstatement material mass, and provides it to the user. This could provide a quick indication of compliance to the user. The auditing tool may provide further functionality, for example supplementing the information from the central data facility with measurement of actual air voids of the reinstatement (e.g. by non-destructive testing with an appropriate device, which may be integrated in the auditing tool).

To facilitate association of a reinstatement with a log (and to provide a quality assurance) a reinstatement identifier can be provided. In an example an RFID tag is embedded in the reinstatement. An inspection of the reinstatement can include reading the RFID tag as identifier and obtaining the log of the reinstatement or a record supporting reinstatement compliance from a central data facility.

Figure 11:
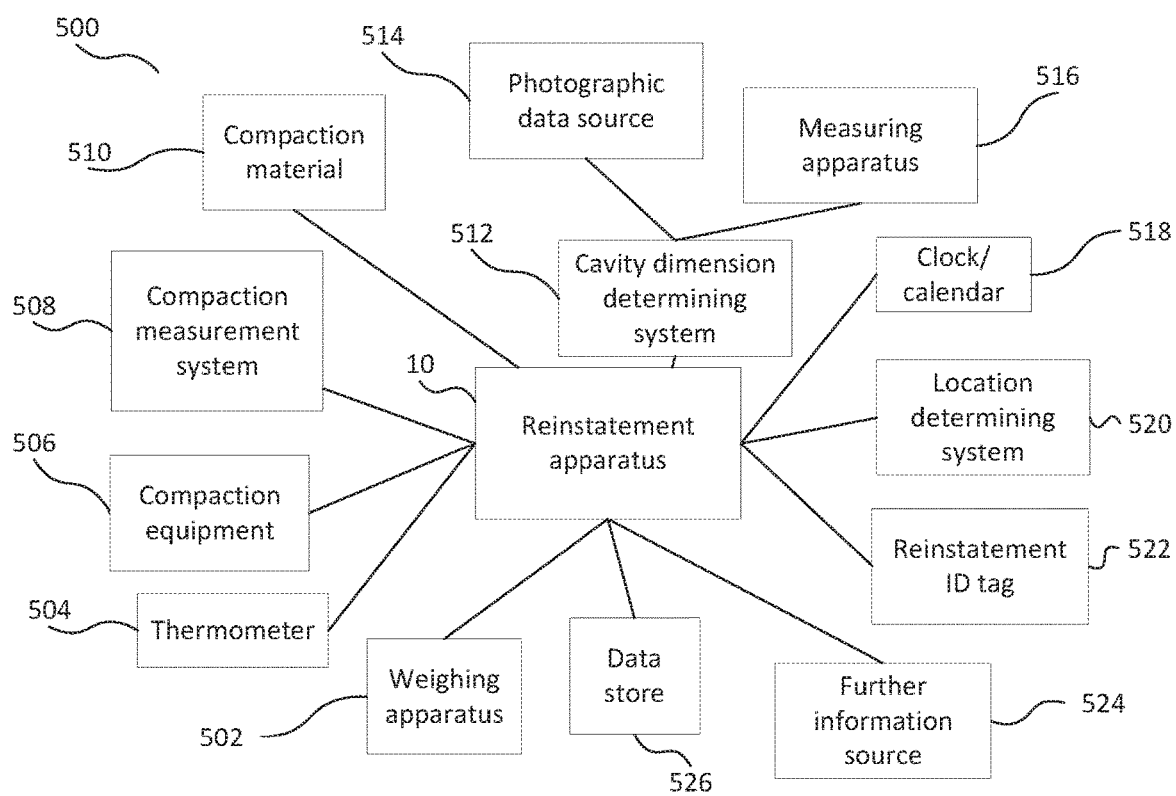
FIG. 11 shows a reinstatement system.

FIG. 11 shows an example of a reinstatement system 500 with a reinstatement apparatus 10 as described above and a number of peripheral devices and systems that are in communication with the reinstatement apparatus 10.

In order to determine the weight of reinstatement material actually used for the reinstatement, a weighing apparatus 502 is provided. The weighing apparatus 502 can for example be a mobile scale platform on which a barrow or other receptacle can be placed for weighing out the reinstatement material. The weighing apparatus 502 can be integrated in a barrow or other receptacle. The weighing apparatus 502 can be integrated at a bulk receptacle of the reinstatement material (such as a lorry or a hopper or a hot box) such that the reduction of the receptacle weight indicates the mass of material used for the reinstatement. In an example a receptacle (e.g. a wheel barrow) has an integrated weighing apparatus 502 and thermometer 504 to provide both mass information and temperature information to the reinstatement apparatus 10.

In the example illustrated above with reference to FIG. 9 the weighing apparatus is not in communication with the reinstatement apparatus 10, but instead the user can enter information obtained from the weighing apparatus. Alternatively the weighing apparatus can be in communication with the reinstatement apparatus 10 such that the user does not need to enter information from the weighing apparatus. The weighing apparatus may receive information regarding a required material mass, and may for example provide an audio or visual signal when the required material mass is reached as a user pours out material.

In order to provide indications regarding whether sufficient compaction is achieved, the compaction equipment may provide details of the equipment used for compaction to the reinstatement apparatus 10. In addition, a compaction measurement system 508 can provide information regarding the compaction, for example compaction vibration frequency and compaction duration. This can provide information for determining when sufficient compaction has been achieved (in place of or in addition to compaction with a number of passes as specified by the guidelines, see Table 2 above). For example, the reinstatement apparatus 10 can show a colour indicating to a user when optimal compaction is achieved for a particular reinstatement, or give another signal directly to the user, or to the compaction equipment. The compaction measurement system may receive information regarding a required compaction, and may for example provide an audio or visual signal when the required compaction is reached.

A cavity dimension determining system 512 may be provided external to the reinstatement apparatus 10, or it may be integrated in the reinstatement apparatus 10. As described above, the user may enter cavity shape and dimension information to the cavity dimension determining system 512. Alternatively the cavity dimension determining system 512 (or the reinstatement apparatus 10) may obtain dimension information from a measuring apparatus 516 such as a digital tape measure, an infrared dimension measuring device, an ultrasound distance measuring device, a laser distance measuring device, or a laser scan system. The cavity dimension determining system 512 (or the reinstatement apparatus 10) may provide instructions to a user for measuring specific dimensions with the measuring apparatus 516 in an expected sequence.

The cavity dimension determining system 512 (or the reinstatement apparatus 10) may permit the user to allocate a measurement value received from the measuring apparatus 516 to a particular dimension. The cavity dimension determining system 512 (or the reinstatement apparatus 10) may obtain shape information from an external source such as a camera (which may alternatively be integrated in the reinstatement apparatus 10) or another shape and/or dimension determining device. In an example a suitable camera can provide both shape information as well as temperature information (as mentioned above) by way of infrared imaging.

The reinstatement apparatus 10 may communicate with an ID tag 522 (such as an RFID tag or a barcode) specific to the reinstatement, in order to link the record of the reinstatement to the actual reinstatement.

The reinstatement apparatus 10 can communicate with further external information sources, such as:
- an external clock and/or calendar 518 to obtain time and date information;
- a location determining system 520 such as a GPS device to obtain location information; and/or
- a further information source 424 such as a public database to provide current weather information or a user identification/authentication to verify user identity and credentials.

As mentioned above, the reinstatement apparatus 10 can communicate with a data store 526 such as central data facility where logs of reinstatements are recorded and stored and processed. The details of the reinstatement can be provided to support compliance of the reinstatement with the requirements and guidelines, and can be mined to extract information.

Communication between the reinstatement apparatus 10 and the peripheral devices and systems (insofar as the peripheral devices and systems are not integrated in the reinstatement apparatus) is by conventionally known means such as wireless communication by Bluetooth, wireless USB, 3G, 4G, 5G, or other radio transmission, infrared communication, or other; or by way of a physical connection such as a cable.

In order not only to support compliance of a reinstatement with the necessary requirements and guidelines, but to certify compliance, user manipulation of some of the inputs to the reinstatement apparatus 10 may not be enabled and input only by a trusted device may be accepted. This can increase the confidence that a reinstater processed the reinstatement in accordance with the output of the reinstatement apparatus 10, and can help avoiding manipulation of the reinstatement apparatus 10 to simulate compliance.

Figure 12:
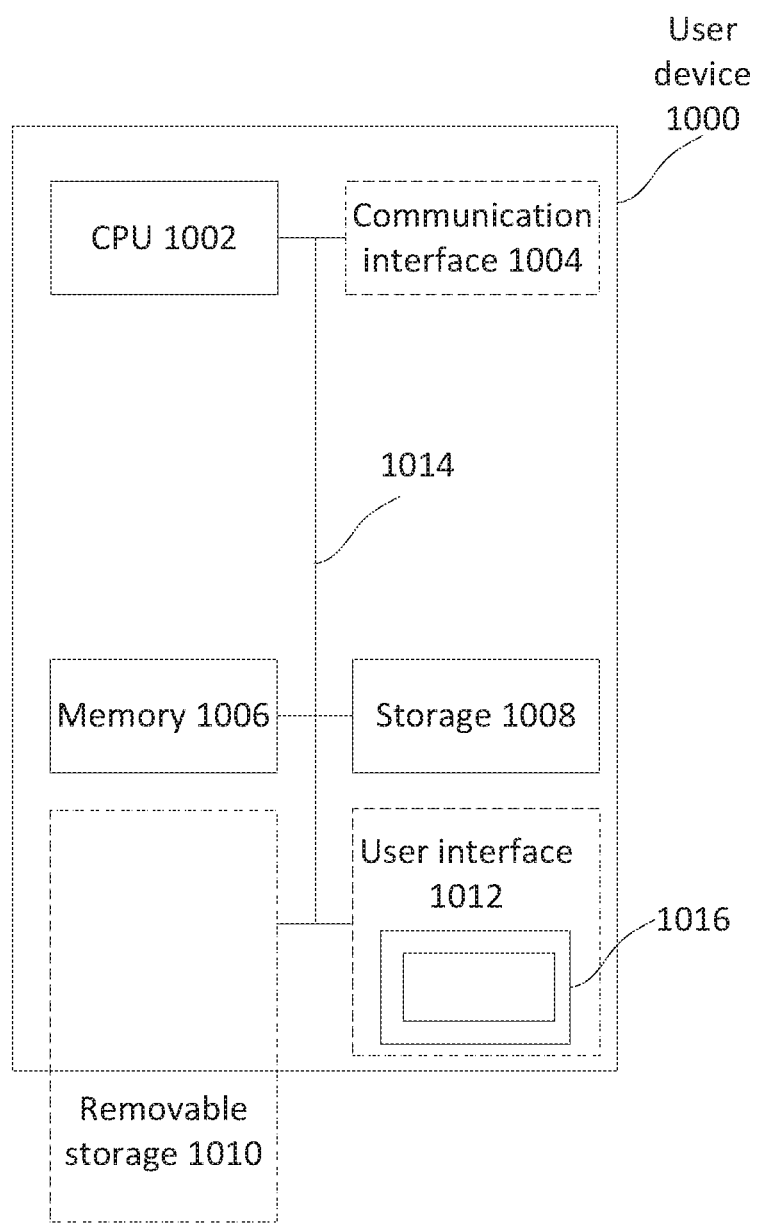
FIG. 12 shows an example of a user device suitable for implementing the reinstatement apparatus.

FIG. 12 shows an example of a user device 1000 (such as a mobile telephone (or "smartphone") or tablet computer) suitable for implementing the reinstatement apparatus 10. The user device 1000 comprises a processor in the form of a CPU 1002, a memory 1006, storage 1008, removable storage 1010 and a user interface 1012 coupled to one another by a bus 1014. The user interface 1012 comprises a display 1016 and an input/output device, which in this embodiment is integrated into the display 1016 as a "touchscreen" (although it will be appreciated that other input/output devices, such as a keyboard and a mouse, may be used). The computer device further comprises a communication interface 1004.

The CPU 1002 executes instructions, including instructions stored in the memory 1006, the storage 1008 and/or removable storage 1010.

The memory 1006 stores instructions and other information for use by the CPU 1002. The memory 1006 is the main memory of the computer device 1000. It usually comprises both Random Access Memory (RAM) and Read Only Memory (ROM).

The storage 1008 provides mass storage for the computer device 1000. In different implementations, the storage 1008 is an integral storage device in the form of a hard disk device, a flash memory or some other similar solid state memory device, or an array of such devices.

The removable storage 1010 provides auxiliary storage for the computer device 1000. In different implementations, the removable storage 1010 is a storage medium for a removable storage device, such as a portable flash drive or some other similar portable solid state memory device, or an array of such devices. In other embodiments, the removable storage 1010 is remote from the computer device 1000, and comprises a network storage device or a cloud-based storage device.

The display 1016 is configured to act as a user input interface as previously described, and is configured to show the displays of FIGS. 3 to 10 in dependence on user input.

The communication interface 1004 is typically a transceiver suitable coupling the bus 1014 to a data network. The reinstatement apparatus communicates with the peripheral devices and systems described with reference to FIG. 11 via the communication interface 1004.

The reinstatement apparatus 10 is generally implemented as a computer program product, which is stored, at different stages, in any one of the memory 1006, storage device 1008, and removable storage 1010. The storage of the computer program product is non-transitory, except when instructions included in the computer program product are being executed by the CPU 1002, in which case the instructions are sometimes stored temporarily in the CPU 1002 or memory 1006. It should also be noted that the removable storage 1008 is removable from the user device 1000, such that—in some embodiments—the computer program product may be held separately from the user device 1000 from time to time.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A system for processing a pavement reinstatement, the system comprising:
a weighing apparatus for measuring a mass of reinstatement material; and
a reinstatement apparatus adapted to receive reinstatement dimension information and reinstatement material information and adapted to determine a required reinstatement material mass, whereby to provide a target air voids content of the reinstatement;
wherein the reinstatement comprises a first layer of a first material and a second layer of a second material, and wherein the reinstatement apparatus is adapted to determine a required first reinstatement material mass and a required second reinstatement material mass to provide a first target air voids content of the first layer and a second target air voids content of the second layer; wherein the first material is a binder material and the second material is a surface material.

2. A system according to claim 1, wherein the reinstatement dimension information includes reinstatement shape information and one or more dimension values and wherein the reinstatement apparatus is adapted to determine a reinstatement surface area from the reinstatement shape information and the one or more dimension values; wherein the reinstatement shape information is in the form of a shape selected from a shape list, a user input shape schematic, or a photograph.

3. A system according to claim 1, wherein the reinstatement apparatus is further adapted to perform one or more of:
determining an actually used reinstatement material mass based on the mass measured by the weighing apparatus; wherein the reinstatement apparatus is further adapted to receive an indication of an unused portion of the mass measured by the weighing apparatus and to determine the actually used reinstatement material mass further based on the unused portion;
determining an estimated actual air voids content of the reinstatement based on the actually used reinstatement material mass; wherein the reinstatement apparatus is further adapted to provide an indication of whether the estimated actual air voids content falls within a range of permitted target air voids contents;
determining a number of lifts for the reinstatement, in dependence on compaction equipment; and/or
dividing the required reinstatement material mass into a number of loads of reinstatement material, in dependence on a maximum load per receptacle.

4. A system according to claim 1, wherein the reinstatement apparatus is further adapted to receive further information in relation to the reinstatement; wherein the further information relates to one or more of the following: a pavement type; a road type; a footway type; a reinstatement location; a date; a time; a duration of work; a weather condition; a user identification; site information; a photograph; compaction equipment; a compaction procedure; a reinstatement material temperature; a sub-base material; a binder material; a surface material, a binder layer depth; a surface layer depth; a compaction duration; a compaction vibration frequency; and a reinstatement identification.

5. A system according to claim 1, wherein the reinstatement apparatus and the weighing apparatus comprise communication modules for communicating with each other for transmission of the indication of the mass measured by the weighing apparatus and/or the required reinstatement material mass.

6. A system according to claim 1, further comprising a thermometer for measuring a temperature of reinstatement material, wherein the reinstatement apparatus receives an indication of a temperature measured by the thermometer.

7. A system according to claim 1, further comprising a compaction measurement system for measuring compaction information, wherein the reinstatement apparatus receives compaction information measured by the compaction measurement system.

8. A system according to claim 1, further comprising a measuring apparatus for determining dimension information, wherein the reinstatement apparatus receives dimension information determined by the measuring apparatus, wherein the reinstatement apparatus and the measuring apparatus comprise communication modules for communicating with each other for transmission of the dimension information determined by the measuring apparatus.

9. A system according to claim 1, further comprising a reinstatement identification tag for identifying the reinstatement; wherein the reinstatement identification tag is an RFID tag for embedding in the reinstatement.

10. A system according to claim 1, wherein the reinstatement apparatus is further adapted to transmit a record of the reinstatement to a data store; the system further comprising a reinstatement identification tag, wherein the reinstatement identification tag is an RFID tag for embedding in the reinstatement and provides a unique identifier of the reinstatement in the record.

11. A system according to claim 10, further comprising a data store adapted to receive a record of the reinstatement; wherein the data store is adapted to receive a query in respect of a reinstatement and to provide information in relation to the reinstatement on the basis of the record; and wherein the system further comprises an auditing apparatus adapted to submit a query in respect of a reinstatement to the data store and to receive information in relation to the reinstatement.

12. A system according to claim 1, wherein the reinstatement dimension information includes a length and a width and wherein the reinstatement apparatus is adapted to determine a reinstatement surface area from the length and width.

13. A system according to claim 12, wherein the reinstatement apparatus is adapted to determine one or more of:
  a reinstatement volume from the reinstatement surface area and a depth value or representative depth value, wherein the representative depth value is an average depth value or a median depth value, and wherein the reinstatement apparatus is adapted to determine a reinstatement volume further in dependence on an item located within the reinstatement; wherein the item is a lid, a stop tap, a fire hydrant, a meter housing or a drain housing;
  a maximum theoretical density from the reinstatement material information; wherein the maximum theoretical density is a representative maximum theoretical density from a range of known maximum theoretical densities; and/or
  the target air voids content of the reinstatement from the reinstatement material information; wherein the target air voids content is a representative target air voids content from a range of permitted target air voids contents.

14. A system according to claim 13, wherein the reinstatement apparatus determines the required reinstatement material mass from the reinstatement, volume and from the target air voids content.

15. A system according to claim 1, wherein the reinstatement dimension information includes one or more depth values; wherein the reinstatement apparatus is adapted to determine a representative depth value from the one or more depth values and wherein the representative depth value is an average depth value or a median depth value.

16. A system according to claim 15, wherein the reinstatement dimension information includes depth profile information.

17. A method of processing a pavement reinstatement, the method comprising determining a required reinstatement material mass from reinstatement dimension information and from reinstatement material information in order to provide a target air voids content of the reinstatement;
  wherein the reinstatement comprises a first layer of a first material and a second layer of a second material, and wherein the method further comprises determining a required first reinstatement material mass and a required second reinstatement material mass to provide a first target air voids content of the first layer and a second target air voids content of the second layer; wherein the first material is a binder material and the second material is a surface material.

* * * * *